Sept. 29, 1959     R. J. WAGNER     2,906,522
PIVOT MECHANISM
Filed June 1, 1954
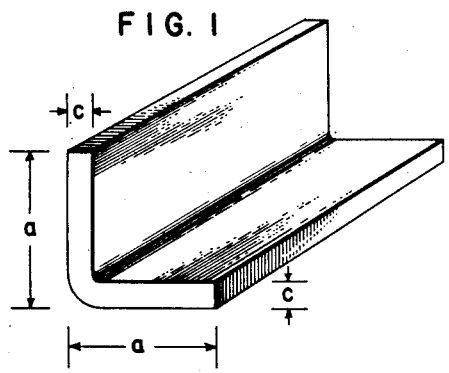
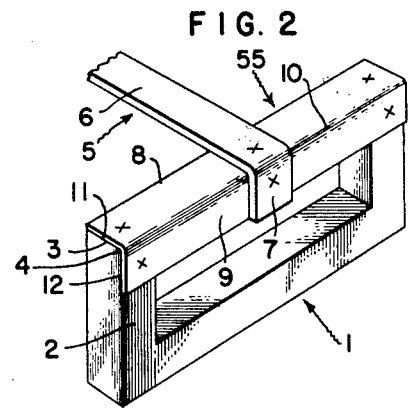
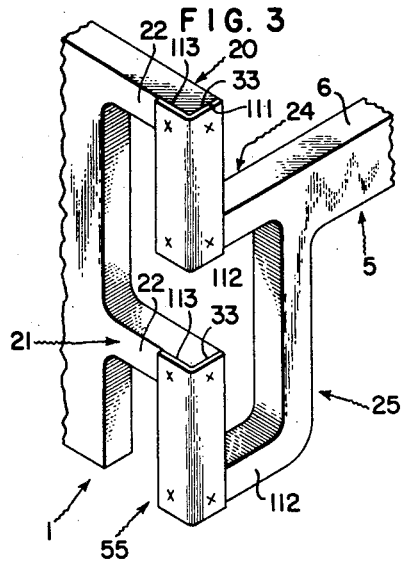
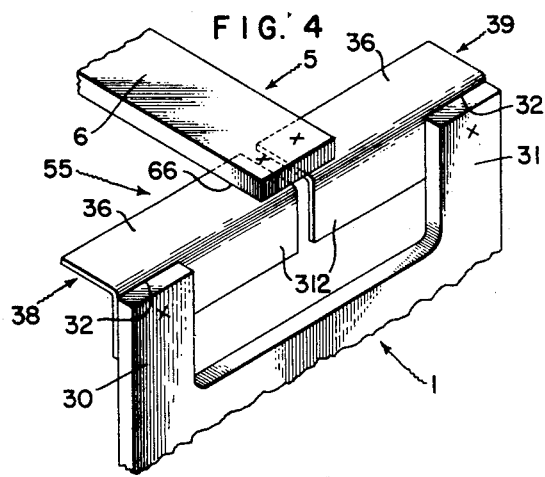
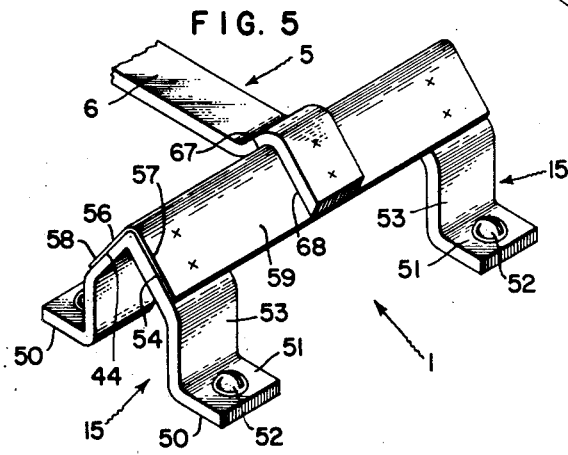
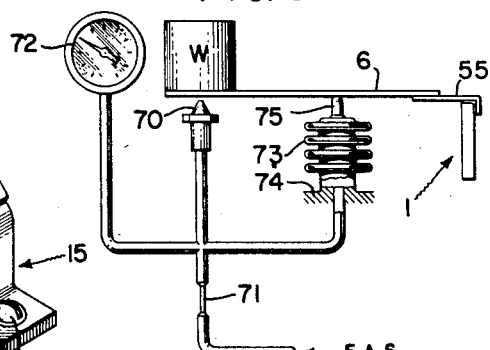
*INVENTOR.*
ROBERT J. WAGNER
BY
*Arthur H. Swanson*
ATTORNEY.

United States Patent Office 2,906,522
Patented Sept. 29, 1959

2,906,522

PIVOT MECHANISM

Robert J. Wagner, Feasterville, Pa., assignor to Minneapolis-Honeywell Regulator Company, Minneapolis, Minn., a corporation of Delaware Application June 1, 1954, Serial No. 433,669

4 Claims. (Cl. 267—1)

The general object of the invention described herein is to provide an improved pivot mechanism formed by a base or support, an active member or angle bar having a portion secured to the base and a portion rotatable with relation to the base, and a pivoted member or beam secured to a portion of the active member crosswise thereof at a location spaced from the connection between the active member and the base or support. The base or support and the pivoted member or beam are relatively rigid while the active member or angle bar is relatively flexible.

When a force is applied to the pivoted member at a point spaced from the axis of the active member, the active member twists about an axis lengthwise thereof, while that portion of the active member attached to the base remains stationary.

A more specific object of the invention is to provide a pivot mechanism having an active element comprised of an angle bar which has at least one of its ends fixed. Attached to another portion of the active element is the member to be pivoted. When a torque or twisting force is applied to the pivotable member, the angle bar attached thereto readily yields and twists about an axis substantially coincident with a line parallel to and halfway between the inside and outside corners as formed by the intersection of the angle bar flanges. Because of the high resistance to all forces tending to produce translation and/or rotation of the pivotable member except that tending to produce rotation about the aforementioned axis, the mechanism described provides a novel and useful pivot mechanism of the limited rotation type.

The pivot herein described has a number of advantages, among them being the following: the pivot is frictionless except for internal friction of the angle bar material and therefore is not subject to hysteresis; because there is no friction there can be no wearing of parts; the pivot axis remains substantially unchanged throughout a large portion of the useable rotation of the pivot; it is characterized by its simplicity of design and by the small number of required parts; it can be used in application requiring very low gradient but high mechanical strength.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a perspective view of an angle bar formed by a pair of flanges;

Fig. 2 is a perspective view of a torsion angle pivot;

Fig. 3 is a perspective view of a modification;

Fig. 4 is a perspective view of a second modification;

Fig. 5 is a perspective view of a third modification; and

Fig. 6 is a diagrammatic or schematic view of one form of measuring and indicating instrument in which this torsion angle pivot is useful.

Referring to Fig. 1, there is shown an angle bar adapted to form the active member of a torsion angle pivot and having a pair of flanges. Each of these flanges has a width $a$ and a thickness $c$ respectively equal to the width or thickness of the other. For purpose of calculation the formula which most closely approximates the action of the torsion angle pivot whose active member has flanges of equal width and thickness is as follows:

$$\theta \text{ (theta)} = \frac{3T}{c3G(2a-c)}$$

In the foregoing equation, $\theta$ (theta) is equal to the angle of rotation in radians per unit of length in inches; $c$ is the thickness of either flange of the active member in inches; $a$ is the width of either flange in inches; $G$ is the shear modulus of elasticity of the material used in the active member in pounds per square inch; $T$ is the torque in inch pounds.

Fig. 2 is a perspective view showing one form of the torsion angle pivot. In this form, the torsion angle pivot consists of a rigid support (generally indicated at 1) and having two pairs of flat surfaces 2 and 3 thereon. Flat surfaces 2 and 3 meet at a corner or angle 4 which is adjacent the axis about which the pivoted member rotates according to the formula above.

The member pivoted on support 1 is indicated as a whole by 5. Member 5 comprises a beam 6 shown in the form of a flat, relatively rigid strip and having one portion or end 7 turned at an angle thereto.

The active member is indicated as a whole by 55. Active member 55 comprises a relatively flexible angle bar having a pair of flanges 8 and 9 which meet in a corner 10. Adjacent this corner 10 is the axis about which the pivoted member rotates. Flange 8 has on it a flat surface 11 and flange 9 has on it a flat surface 12. Flat surface 11 engages flat surface 3 of support 1 while flat surface 12 engages flat surface 2 of support 1.

The torsion angle pivot formed by the support 1, the active member 55, and the pivoted member 5 may be fabricated from a variety of materials, such as, plastic or metal, including brass, phosphor-bronze, or stainless steel. The torsion angle pivot formed by the support 1, the active member 55, and the pivoted member 5 may be fabricated in a number of different ways. The beam 6 and the flanges 8 and 9 may be cast, molded, or stamped all in one piece, particularly if made of plastic. Alternatively, the torsion angle pivot may be fabricated by securing the pivoted member 6 to the flanges 8 and 9 by spot welding, riveting, or soldering. Likewise, the flat surfaces 2 and 3 may be secured to the flat surfaces 11 and 12 in a number of different ways including spot welding, riveting, soldering, or clamping by means of screws or bolts, or by flat members screwed or bolted so as to clamp flanges 8 and 9 against the flat surfaces 2 and 3.

Fig. 3 shows a modification. In this modification the support 1 has two posts 20 and 21 extending therefrom. Posts 20 and 21 each have a flat surface 22 and a second flat surface 33 at an angle to the flat surface 22. The pivoted member 5 has a pair of posts 24 and 25 extending from the beam 6. Posts 24 and 25 have a flat surface 112 and each has an end flat surface not seen in the drawing. The active member 55 comprises a pair of angle bars or two pairs of flanges secured between the posts 20 and 21 on the support 1 and the posts 24 and 25 on the pivoted member 6. These angle bars each have a flat inner surface 111 adapted to engage and be secured to the flat surface 33 on the support 1 and the flat surfaces 112 on the pivoted member 6. These angle bars or flanges also each have a flat surface 113 adapted to be secured to the flat surfaces 22 on the support 1 and to the unnumbered, flat surfaces on the ends of pivoted member 6.

Fig. 4 shows a second modification in which the support, generally indicated at 1, has a pair of posts 30 and 31 upstanding therefrom and spaced from each other. Posts 30 and 31 each have a flat surface 32 thereon. The pivoted member 5 comprises a beam 6 in the form of a flat strip 6 having a flat surface 66. The active member 55 comprises a pair of angle bars, generally indicated at 38 and 39. Each has a flat surface 312 secured to the flat surface 32 of the posts 30 and 31. The angle bars 38 and 39 also have a flat surface 36 secured to the flat surface 66 of the beam 6.

Fig. 5 shows yet another modification in which the support, generally indicated at 1, has a pair of generally U-shaped brackets secured to it. These brackets are generally indicated by the reference character 15. Brackets 15 comprise a pair of flat surfaces 50 formed on flanges 51 having perforations passing through them. Screws 52 pass through these perforations into suitably threaded holes (not shown) in support 1. Brackets 15 also have vertical portions 53 and a V-shaped portion having flat faces 44 and 54 on it.

The pivoted member, generally indicated at 5, comprises a bar 6 having flat surfaces 67 and 68 on it. These flat surfaces 67 and 68 are secured to flat surfaces 56 and 57 of the active member 55 composed of an angle bar comprising a pair of flanges 58 and 59. The beam 6 and the flanges 58 and 59 may be fabricated all in one piece or may be made of separate parts fastened together. Flat surfaces 56 and 57 are secured to flat surfaces 54 and 55 by spot welding, riveting, or soldering.

Fig. 6 shows an instrument useful for measuring and indicating a load, such as a weight. The instrument of Fig. 6 is in effect a pneumatic scale. This instrument comprises a torsion angle pivot as shown in Fig. 2. This torsion angle pivot comprises a support 1, an active member 55 comprising an angle bar having flanges 8 and 9 on which a pivoted beam 6 is mounted. The weight, which is to be measured, forms a load on the free end of the beam 6 remote from the pivot axis. Changes in the weight W, applied to the free end of the beam 6, cause the free end of the beam 6 to vary with relation to the end of a stationary nozzle 70 which is supplied with air from a source of filtered, compressed air F.A.S. A restriction 71 connects source F.A.S. to nozzle 70, to an indicator in the form of a pressure gauge 72, and to a bellows 73 having a fixed end 74 and a free end 75 adapted to engage a portion of beam 6 remote from the pivot axis. An increase in the weight W applied to the beam 6 causes the gap between the free end of beam 6 and stationary nozzle 70 to become smaller. This increases the back pressure between the nozzle 70 and the restriction 71 and therefore increases the pressure in indicator 72 and in bellows 73. This increased pressure within the bellows 73 causes its free end 75 to move beam 6 about its pivot in the opposite direction. This is the force balance mode of operation in which the weight W is balanced against the air pressure in bellows 73 so as to cause the free end of beam 6 to quickly come to rest at a position which can be calibrated so as to read the force applied by weight W to the beam 6.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. A pivot mechanism comprising a rigid support having a pair of spaced posts projecting therefrom, said posts each having a pair of flat surfaces thereon at an angle to each other, a pair of angle bars each having a pair of flat surfaces thereon at an angle to each other, and a pivoted member having a pair of spaced posts projecting therefrom, each post having a pair of flat surfaces thereon at an angle to each other, portions of the flat surfaces on said angle bars being secured to the flat surfaces on said support and to the flat surfaces on said pivoted member.

2. A pivot mechanism comprising a rigid support having a pair of spaced posts projecting therefrom, said posts each having at least one flat surface theeron, a pair of angle bars each having two flat surfaces thereon at an angle to each other, and a pivoted beam having at least one flat surface thereon, a portion of one of the flat surfaces on said angle bars being secured to the flat surfaces on said posts and a portion of the other of said flat surfaces on said angle bars being secured to the flat surface on said pivoted member at a location spaced away from the portions of the flat surfaces on said posts connected to portions of the flat surfaces on said angle bars.

3. A pivot mechanism providing limited rotation, including, a relatively rigid support, an active member having a portion secured to said support and a portion spaced from and rotatable relative to said support, said active member being of substantially uniform L-shaped transverse cross section through its length and formed of two flat flanges each merging with the other along one edge thereof so that the external surfaces of said flanges form an inside corner and an outside corner, said inside corner being formed of the merger of the external surfaces which are at approximately 90 degrees to each other and said outside corner being formed of the merger of the external surfaces which are at approximately 270 degrees to each other, the ends of said flanges being secured to said support, and a relatively rigid pivoted member secured to said active member at a location spaced from the portion of said active member secured to said support, said pivoted member extending transversely of said active member, said active member being relatively flexible so that, when force is applied to said pivoted member at a point spaced from said active member, the active member readily twists about an axis parallel to and substantially half way between the inside and outside corners of said active member and resists all forces tending to produce translation or rotation of the pivoted member except that force tending to produce rotation about said axis.

4. A low torque, flexible pivot having a substantially fixed axis of pivotation, including, a relatively rigid base member, a relatively rigid pivoted member, and a relatively flexible active member comprising an angle bar of substantially uniform L-shaped transverse cross section throughout its length and having a pair of flat flanges that intersect at a merging portion surrounding the pivot axis about which said active member rotates, the ends of said flanges being rigidly secured to said base member at a location adjacent the pivot axis of said active member and said pivoted member being rigidly secured to an intermediate portion of said active member at a location adjacent the pivot axis of said active member, so that said pivoted member is free to rotate about the pivot axis but is held against rotation or translation in any other direction.

References Cited in the file of this patent

UNITED STATES PATENTS

| | | |
|---|---|---|
| 2,238,380 | Almen | Apr. 15, 1941 |
| 2,675,525 | Wiancko | Apr. 13, 1954 |
| 2,681,222 | Stelzer | June 15, 1954 |